A. P. Routt,
Bread Machine,
Nº 56,995.      Patented Aug 7, 1866.
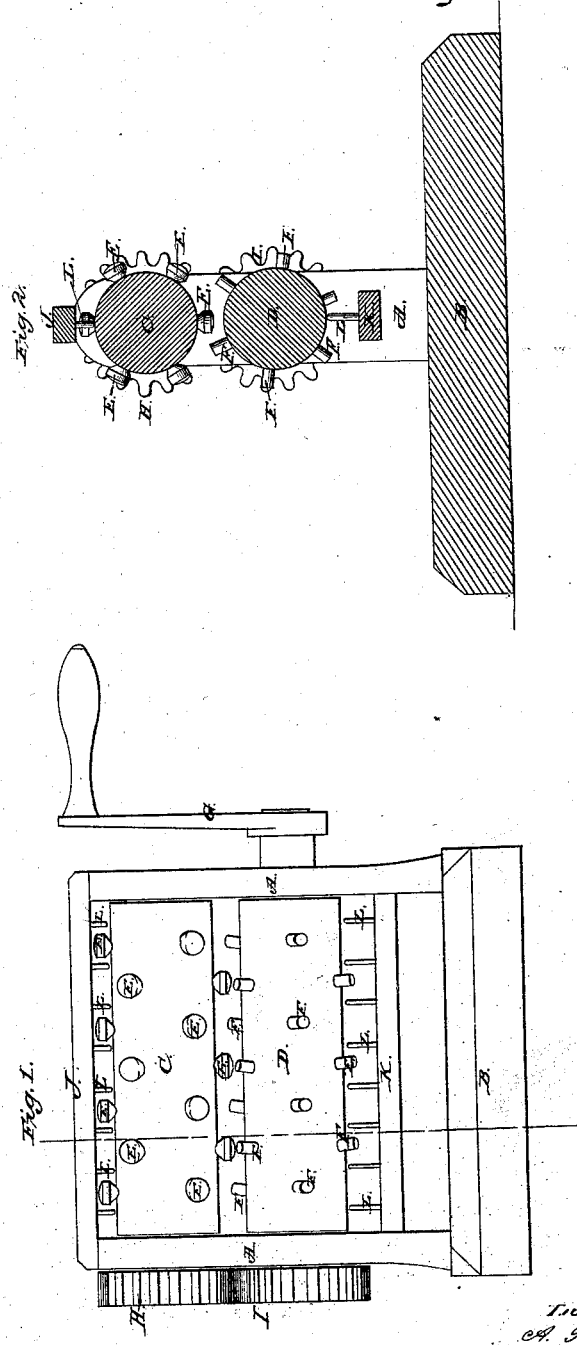

UNITED STATES PATENT OFFICE.

ANSELL P. ROUTT, OF ORANGE COURT-HOUSE, VIRGINIA.

IMPROVED DOUGH-KNEADER.

Specification forming part of Letters Patent No. 56,995, dated August 7, 1866.

*To all whom it may concern:*

Be it known that I, ANSELL P. ROUTT, of Orange Court-House, in the county of Orange and State of Virginia, have made a new and useful Apparatus for Kneading Dough; and I do hereby declare the following to be a full, clear, and exact description of the nature, construction, and operation of the same, sufficient to enable one skilled in the art to which it appertains to construct and use the same, reference being had to the accompanying drawing, which shows a front elevation of my invention.

The machine consists of a pair of rollers revolved simultaneously by a pair of cog-wheels, one cylinder being armed with straight pins or projections and the other with rounded knobs, to imitate the action of the fists upon the dough which is passed between the rollers. Above and below the rollers are pins, which cut the dough into strips to detach it more readily from the rolls.

In the drawing, A A are the standards, and B the bed-plate, of the machine. In the standards are journaled the rollers C D, the upper being armed with a set of rounded knobs or pounders, E, which approximate, in some degree, the form of the human fists, and are intended to have a similar action upon the dough. The lower roller, D, has projecting pins F, with straight sides, whose office is to penetrate the dough and hold it for the action of the pounders E, which press the dough against the lower roller in the spaces between the pins F.

The hand-crank G and the cog-wheels H I secure the simultaneous action of the rollers C D. The bars J K, which connect the side standards, A A, are armed with projecting pins or knives L L, whose office is to cut into strips the dough which is brought against them.

The machine may have a feeding table or platform, from which the dough is passed to the rolls, and on which it is received from them; or the lumps of dough may be presented by the hand to the action of the rolls, as shown in the drawing.

The action of the machine upon the dough is effective and speedy, and a great saving in time and labor is obtained by its use.

Having described my invention, what I claim therein as new, and desire to secure by Letters Patent, is—

1. The combination of the two rollers, provided respectively with the round-headed projections and the straight-sided pins, as and for the purpose described.

2. In combination with the above, the cutters L L, substantially as and for the purpose described.

ANSELL P. ROUTT.

Witnesses:
   I. I. KEETON,
   J. F. FOGG.